United States Patent [19]

Murphy

[11] Patent Number: 4,946,021
[45] Date of Patent: Aug. 7, 1990

[54] MULTIPLE POSITION, CONVEYOR MOUNTABLE WORKPIECE CARRIER

[75] Inventor: James F. Murphy, Lynchburg, Va.

[73] Assignee: Simplimatic Engineering Company, Lynchburg, Va.

[21] Appl. No.: 258,486

[22] Filed: Oct. 17, 1988

[51] Int. Cl.[5] .................................................. B65G 49/00
[52] U.S. Cl. .................................. 198/375; 198/465.2; 198/803.01; 29/33 P
[58] Field of Search .................... 198/344, 345, 465.1, 198/465.2, 465.3, 803.01, 803.2, 375; 269/56, 58, 73; 29/33 P

[56] References Cited

U.S. PATENT DOCUMENTS

| | | | |
|---|---|---|---|
| 2,079,332 | 5/1937 | Kokotiak | 90/59 |
| 2,595,137 | 4/1952 | Hagopian | 90/59 |
| 2,819,654 | 1/1958 | Coy | 90/59 |
| 3,030,135 | 4/1962 | Polanski | 269/73 |
| 3,143,791 | 8/1964 | Lanahan et al. | 29/203 |
| 3,273,879 | 9/1966 | Floren | 269/73 |
| 4,579,517 | 4/1986 | Biggs | 198/377 X |
| 4,598,816 | 7/1986 | Kutzli et al. | 198/346.1 X |
| 4,712,670 | 12/1987 | Burkhardt | 198/803.01 |

FOREIGN PATENT DOCUMENTS

| | | | |
|---|---|---|---|
| 217167 | 1/1909 | Fed. Rep. of Germany | 269/73 |
| 3336808 | 5/1985 | Fed. Rep. of Germany | 269/58 |
| 451566 | 9/1949 | Italy | 198/377 |
| 0712329 | 1/1980 | U.S.S.R. | 198/375 |

*Primary Examiner*—David A. Bucci
*Assistant Examiner*—D. Glenn Dayoan
*Attorney, Agent, or Firm*—St.Onge Steward, Johnston & Reens

[57] ABSTRACT

A device is provided for conveying a workpiece along a conveyor path having spaced therealong at least two workstations to present the workpiece in seriatim to the workstations in at least two positional orientations as required for each particular workstation. The device comprises a base for being transported along said path from a first workstation to a next successive workstation along the path, a member mounted on the base for nesting the workpiece in a positional orientation with respect to the base to present the workpiece to each of the workstations, and at least one device for repositioning the nesting member from one position to at least a second position.

17 Claims, 5 Drawing Sheets

MULTIPLE POSITION, CONVEYOR MOUNTABLE WORKPIECE CARRIER

FIELD OF THE INVENTION:

The present invention relates to carriers for transporting workpieces along a conveyor from one workstation to the next in a series of workstations. More particularly, a workpiece carrier is provided that can be releasably mounted on a conveyor or other automation device to carry a workpiece along said series and present said workpiece to each said workstation in a desired positional orientation.

BACKGROUND OF THE INVENTION:

Work holders or tables for machining or other operations are known in the art. See, for example, U.S. Pat. No. 2,079,323 to Kokotiak for "Work Holder For Machining Operations"; U.S. Pat. No. 2,595,137 to Hagopian for "Work Holder"; U.S. Pat. No. 2,819,654 to Coy for "Machine Fixture"; and U.S. Pat. No. 3,143,791 to Lanahan et al. for "Work Positioning Table".

Positioning and holding a workpiece in a positional orientation relative to a workstation is well known. The prior art variously shows work holders for positioning a workpiece and holding it in any desired angular relation to a grinding wheel, drill, or other machining tool. Fixtures are shown for use with milling machines, jig bores, or the like.

It is also known in the art to use a conveyor to transport a workpiece from one workstation to another for presenting said workpiece for a series of operations, such as for example machining operations.

SUMMARY OF THE PRESENT INVENTION

In accordance with a preferred embodiment of the present invention, a device is provided for releasably mounting to a conveyor for carrying a workpiece to a series of workstations to present said workpiece in a number of positional orientations as required for each particular workstation. A number of these devices or workpiece carriers can be readily mounted in a series on a conveyor, with their respective workpieces mounted therein, for presenting a continuous series of workpieces to the workstations in seriatim. Preceding each workstation is an orientation station, and the conveyor is operated so that the workpiece carrier temporarily halts before the orientation station before proceeding to the associated workstation. The orientation station includes a plunger or other means that is extended to engage a camming surface on said carrier and cause repositioning of the workpiece for subsequent presentation to the workstation.

The device of the present invention comprises a base and a nesting receptacle mounted on the base. The receptacle holds the workpiece in a positional orientation with respect to the base, and the receptacle is movable relative to the base for changing the positional orientation. Means associated with at least one of the workstations, preferably a plunger operated at the orientation station, is provided for moving the receptacle from one position to at least one other position. Said moving means can be responsive to a protocol or perhaps computer control for establishing the proper positional orientation for each said associated workstation.

In accordance with a particularly preferred embodiment, the nesting receptacle is rotatably mounted in the base for receiving a workpiece, such as a part for being machined on two surfaces thereof, said surfaces being disposed at an angle to each other. The receptacle has two camming surfaces that are acted upon by plungers mounted at orientation stations preceding an associated workstation. The base carrying the receptacle is momentarily halted on the conveyor adjacent a first plunger at a first orientation station, which is aligned to engage a first camming surface and rotate the receptacle to a first position or angular orientation. The workpiece is then conveyed in the receptacle to the associated workstation for machining on one of the two surfaces.

After this first machining operation, the receptacle carries the workpiece to the second orientation workstation, where a second plunger is extended to engage a second camming surface and rotate the receptacle and the workpiece to a second position or angular orientation. The receptacle is thereafter conveyed to a subsequent workstation for machining on the second surface.

It is an object of the present invention to enable part positioning without the necessity for expensive part transfer devices and different fixtures for different orientations.

It is a further object of the present invention to provide a simple means of completely automatic part positioning.

DETAILED DESCRIPTION OF THE PREFERRED EMBODIMENT

Figure 1:
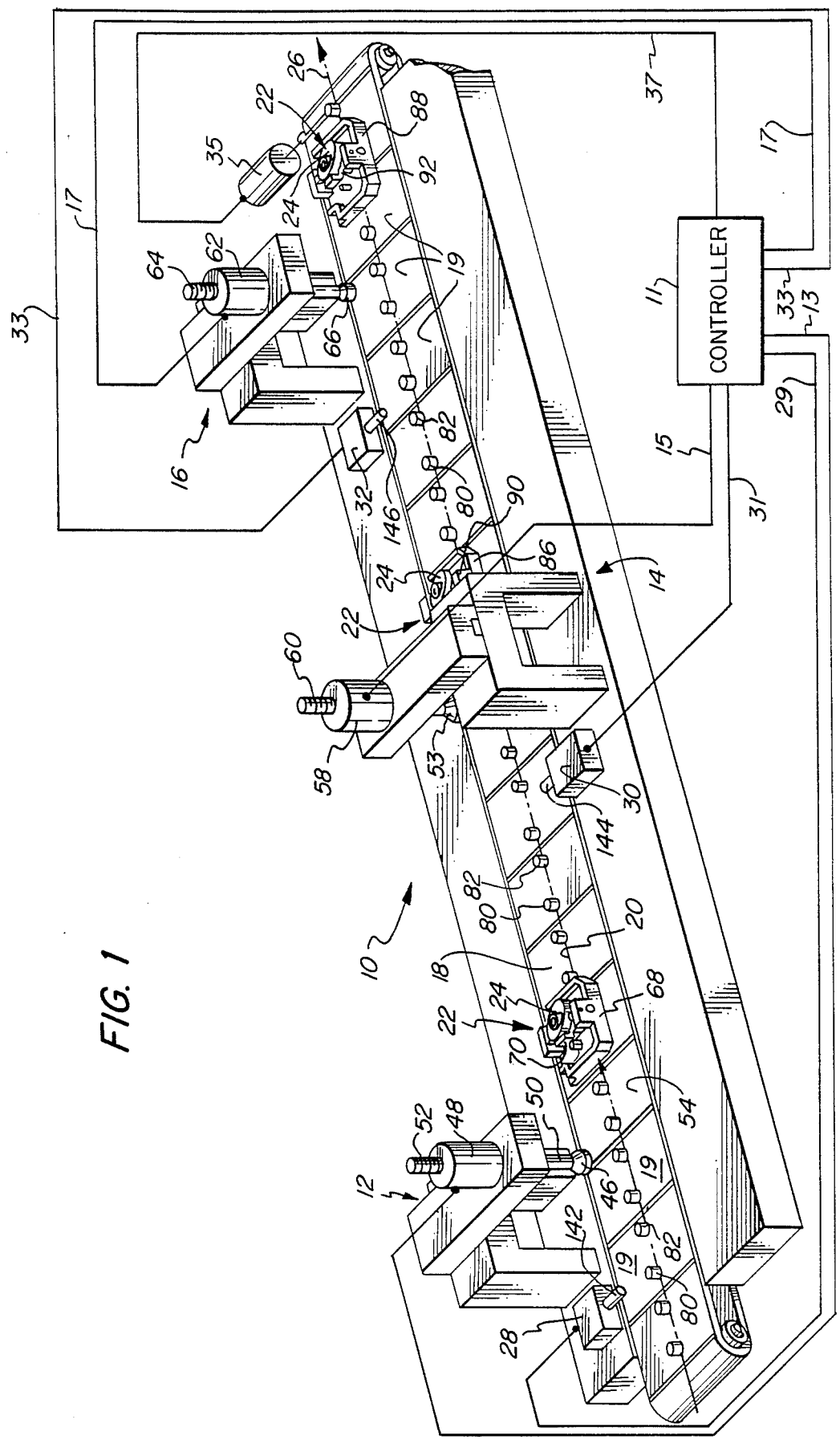
FIG. 1 is a perspective view of a system using the multiple position, conveyor mountable workpiece carrier of the present invention.

With reference to FIG. 1, a system 10 is indicated generally wherein a series of workstations 12, 14, and 16 are disposed in alignment alongside a conveyor 18 defining a conveyor path 20. Three of the workpiece carriers 22 of the present invention are shown mounted onto conveyor 18 for conveying workpieces 24 from workstation to workstation in a preselected direction indicated by arrow 26. Located alongside conveyor 18 prior to each workstation are the orientation stations 28, 30, and 32 for changing the position of workpiece 24 in carrier 22 as described more fully in detail below. In the system of FIG. 1, orientation station 28 and its associated workstation 12 are alongside a first side of the conveyor 18, while orientation station 30 and its associated workstation 14 are alongside the opposite side. As explained below, this is to permit the two camming surfaces that are on opposite sides of the carrier 22 to be activated. Stations 32 and 16 are on the same side as stations 28 and 12. It is understood that the right-hand or left-hand positioning of the stations shown in FIG. 1 is by way of example only and is not intended to be limiting of the invention. Additionally, the orientation station and its associated workstation need not be on the same side, but can be on opposite sides depending upon the positional orientation of the workpiece that is desired. As further explained below, the two camming surfaces are on opposite sides and the orientation station and plunger can be placed on the left or right depending upon which camming surface is to be used.

Controller 11, which can be any suitable control means such as for example a programmable logic controller or computer system, directs the operation of workstations 12, 14, and 16 through lines 13, 15, and 17 respectively and the operation of orientation workstations 28, 30, and 32 through lines 29, 31, and 33 respectively. Motor 35, such as for example a servomotor, is also under direction of controller 11 through line 37 for indexing conveyor 18 to move workpieces 24 from workstation to workstation with stop-and-go motion as described more fully in detail below.

Workstations 12, 14, and 16 can be any desired routine machine for carrying out an operation of the desired kind on workpieces 24. These workstations can be, for example, machining stations, such as for grinding or polishing various surfaces of the workpieces.

Figure 2:
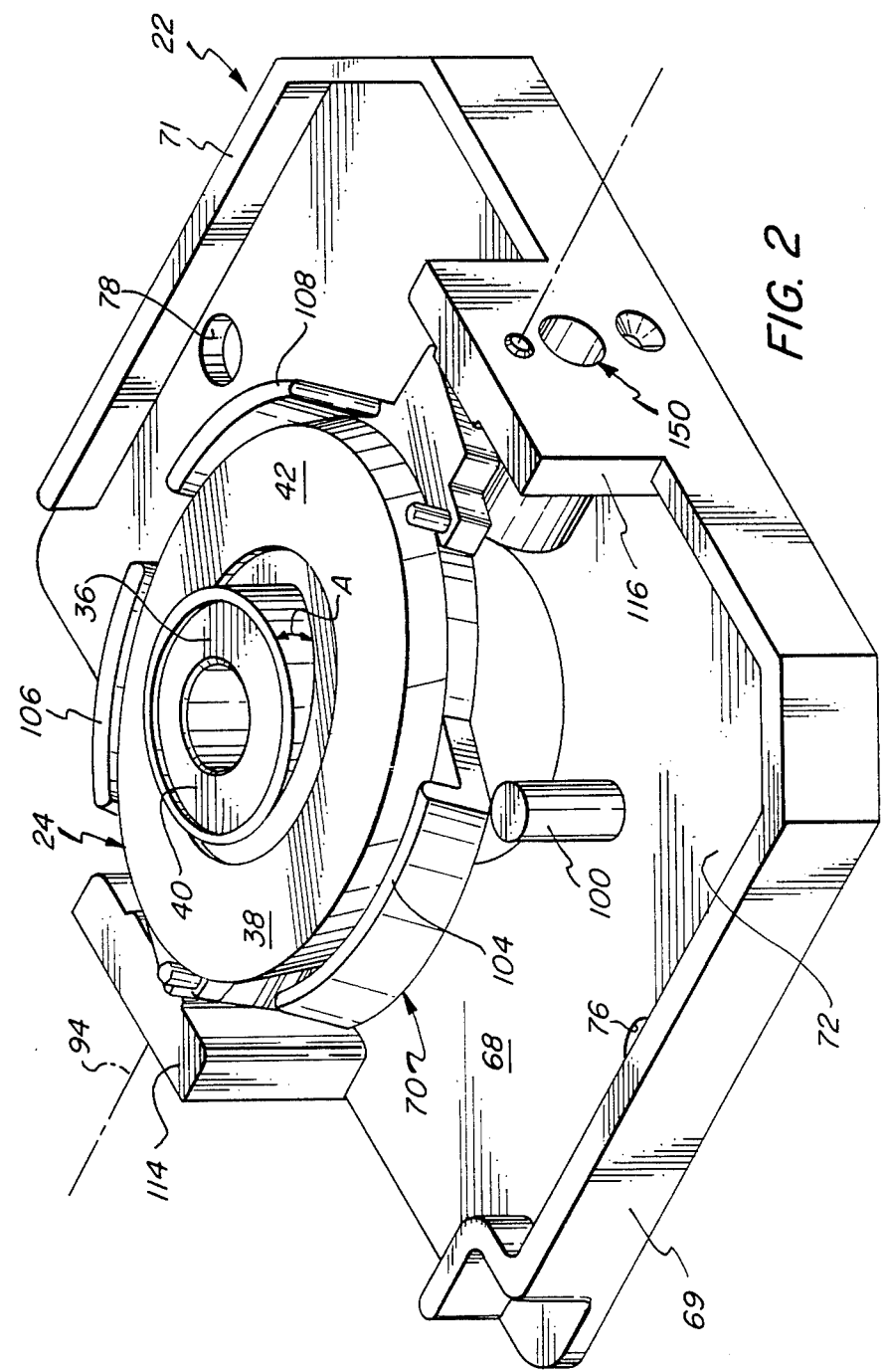
FIG. 2 is a perspective view of a preferred embodiment of the workpiece carrier of the present invention, with a workpiece nested therein.
Figure 2A:
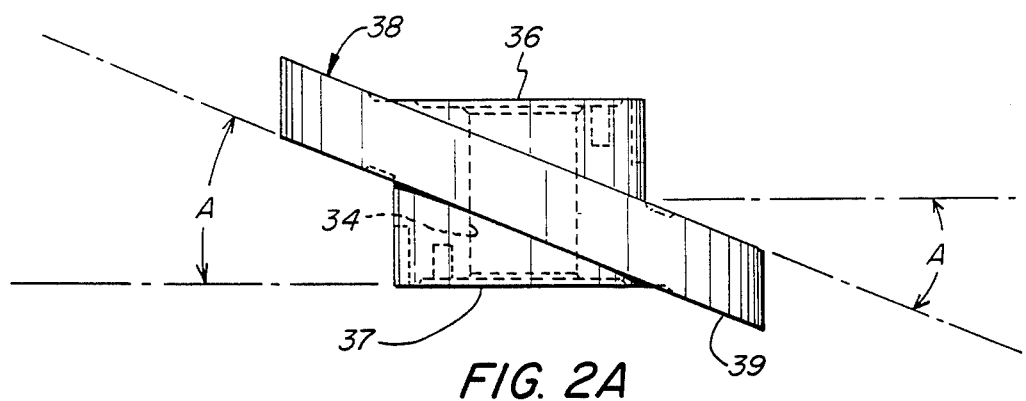
FIGS. 2A and 2B are side and top views respectively of a workpiece carried by the embodiment of FIG. 2.
Figure 2B:
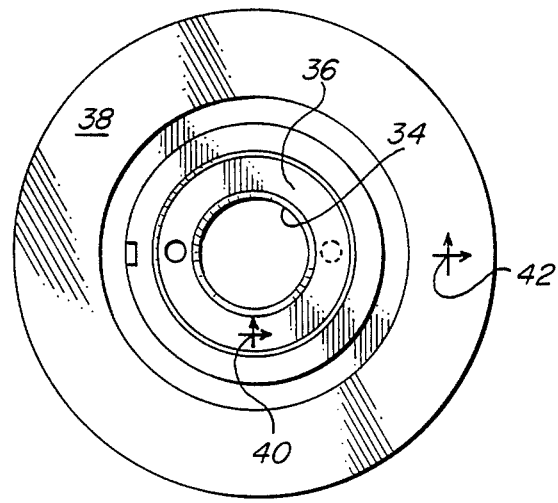

For example, it can be appreciated by reference to FIGS. 2, 2A, and 2B that workpiece 24 is a swashplate, having an aperture 34, to be machined on first and second surfaces 36 and 38, which surfaces 36 and 38 lie in first and second planes 40 and 42 lying at an acute angle A with respect to each other. Corresponding surfaces 37 and 39 on the opposite side of part 24 may also be machined if part 24 is first flipped over.

Workstation 12 can, by way of example only, be adapted for machining surface 36, while workstation 14 can be adapted for machining surface 38. Workstation 16 may then be adapted for further machining surface 36 again in some fashion. That is, workstation 12 may include a grinding wheel 46 sized to machine surface 36. Wheel 46 is driven by motor 48 and is mounted on a shaft 50 which can be raised or lowered by threaded member 52, all of which can be accomplished under direction of controller 11. Wheel 46 is typically mounted for grinding in a plane parallel to conveyor surface 54; that is, a horizontal plane. Similarly, workstation 14 includes grinding wheel 53 sized for surface 38, wheel 53 having its own associated motor 58 and threaded member 60 controlled by controller 11. Wheel 53 would also conveniently be mounted for grinding in a horizontal plane, which can be accommodated because part 24 is tiltable in accordance with the present invention to present face 38 in the horizontal orientation required for wheel 53.

In accordance with the system of the present invention as explained in more detail below, the workpiece 24 rides in carrier 22 and is presented to the first orientation station 28, where carrier 22 is properly positioned or tilted if necessary for surface 36 to be presented to workstation 12 in a horizontal plane. After the desired operation, carrier 22 is moved to orientation station 30, where carrier 22 can be repositioned to tilt the workpiece 4 and present surface 38 to workstation 14 in a horizontal plane. The operation may be repeated, perhaps for a third workpiece surface or perhaps for surface 36 again, at a subsequent orientation station 32 with its associated workstation 16 and its motor 62, threaded member 64, and grinding wheel 66.

With reference now to FIGS. 2, 4, 5A, 5B, and 5C, the workpiece carrier 22 of the present invention includes a base 68 and a nesting receptacle 70 rotatably mounted on base 68 for holding workpiece 24.

Base 68 is preferably formed of a plastic material such as polyurethane, although other materials such as for example acetal, or other thermoplastic can be used as well. In the preferred embodiment, base 68 is a substantially planar member 72 with a bottom face 74 having apertures 76 and 78 for mating with protuberance pairs 80 and 82 on conveyor surface 54. Protuberance pairs 80 and 82 provide means for engaging base 68 to releasably mount base 68 and therefore nesting receptacle 70 onto conveyor 18. This releasable mounting feature provides the advantages of flexability of part orientation in an automatic mode. Protuberance pairs 80 and 82 also provide a convenient way of consistently aligning base 68 and therefore receptacle 70 from left to right and front to back on conveyor 18 for proper presentation to orientation stations 28, 30, and 32 and workstations 12, 14, and 16. Base 68 also has a perimeter 69 with flange 71 extending most of the way around perimeter 69 for the purpose of establishing a "false" thickness of the base without incurring unnecessary material cost.

Conveyor 18 is typically made up of chain links 19 joined to form an endless conveying surface. It is understood that not all chain links 19 need have protuberance pairs 80 and 82, which can be spaced as needed along conveyor 18. In this manner, a plurality of bases 68, 86, and 88 with corresponding nesting receptacles 70, 90, and 92 can be mounted in a series as shown in FIG. 1. It is understood that this series is not limited to three, but can be any reasonable number as determined by the size of the system.

Figure 4:
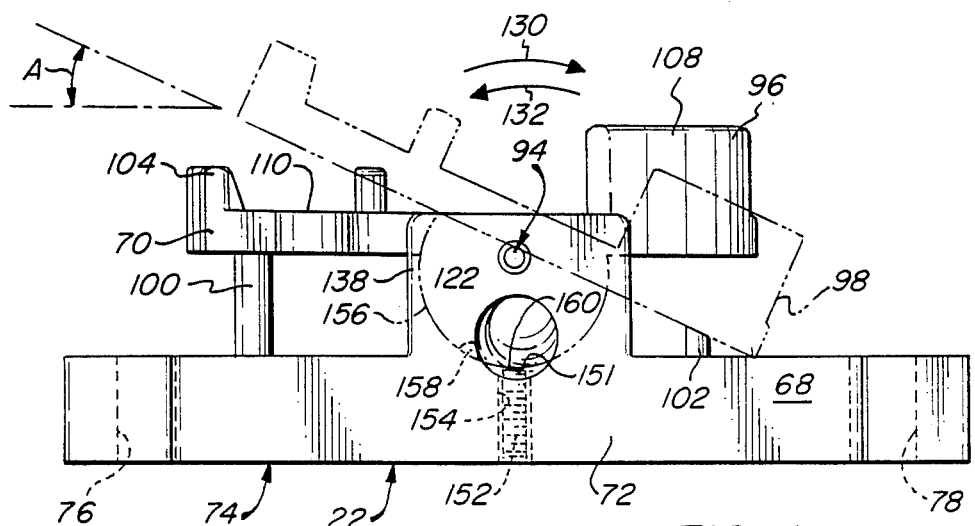
FIG. 4 is a side view of the embodiment of FIG. 3.
Figure 5A:
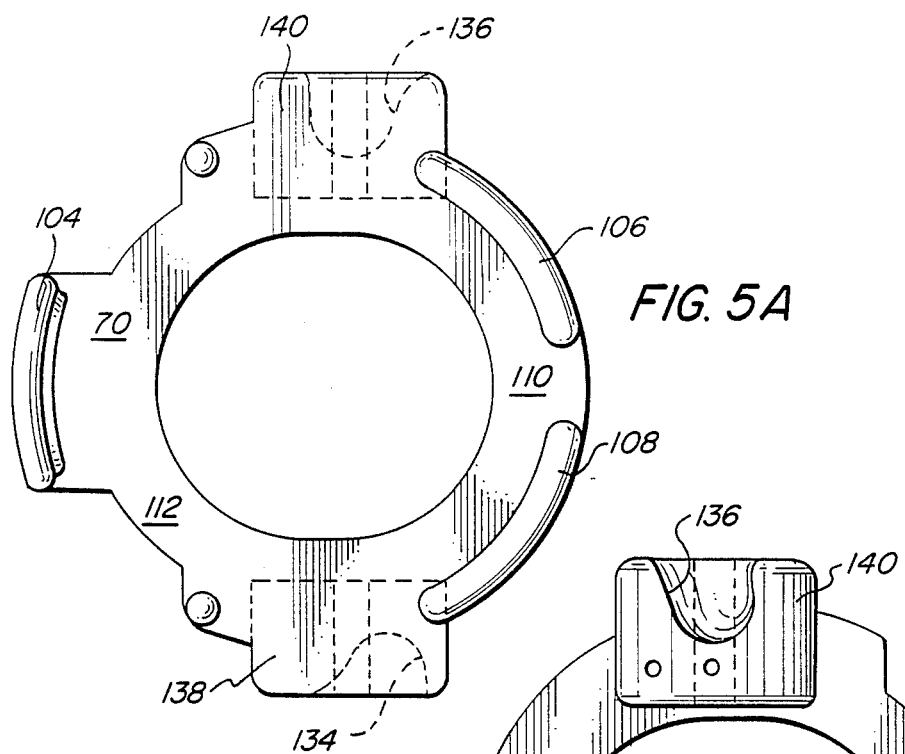
FIGS. 5A, 5B, and 5C are top, bottom, and side views respectively of the nesting receptacle of the workpiece carrier of FIG. 2.
Figure 5B:
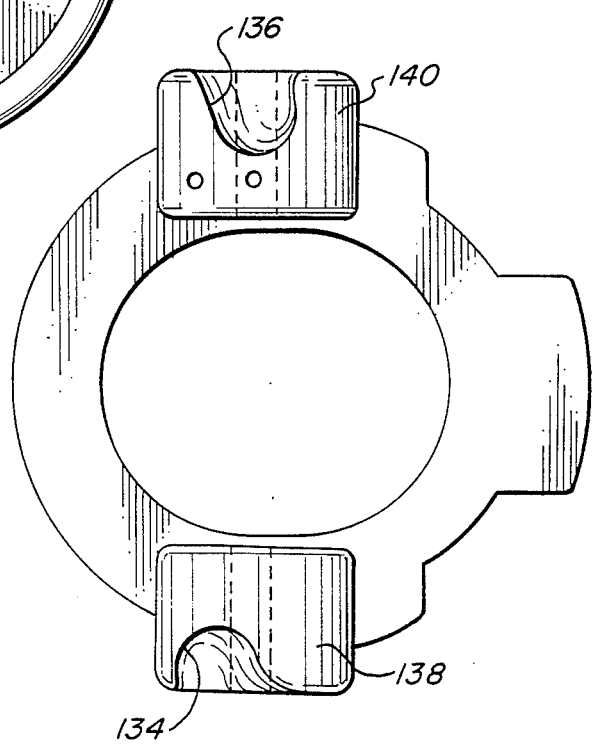
Figure 5C:
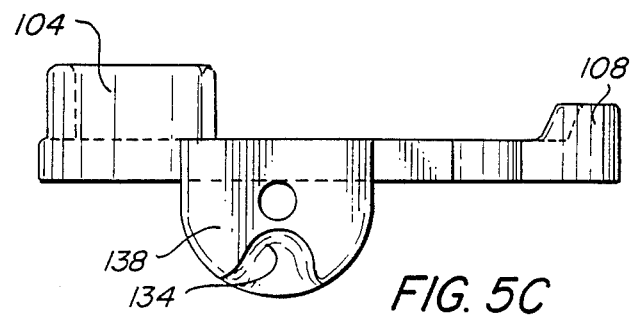

Receptacle 70 is mounted on base 68 and comprises means for nesting the workpiece 24 in a positional orientation with respect to base 68. As seen in FIG. 4, in the preferred embodiment receptacle 70 can be repositioned from alignment generally parallel to base 68 to tilted at some angle A. Receptacle 70 is rotatably mounted on base 68 about a substantially horizontal axis 94. As shown in FIG. 4, receptacle 70 has a first position indicated at 96 characterized by a first angular displacement about axis 94, here forming an angle of substantially 0 with the horizontal. Receptacle 70 also has a second position indicated in phantom at 98 characterized by a second angular displacement A about axis 94. These two angular orientations can be designed to be different from the 0 and A. of the preferred embodiment by simply changing the length of the posts 100 and 102, which can be suitably lengthened or shortened to provide stops restricting the angle through which receptacle 70 can rotate, as described further in detail below.

Receptacle 70 has fitted flanges 104, 106, and 108 for abutting the sides of workpiece 24 to engage same in a relatively snug fit so that workpiece 24 is removably held or nested therein and can be gently pressed into or removed therefrom.

The receptacle 70 provides means for holding the workpiece 24 in a nesting plane 110 that defines the angular orientation of workpiece 24 nested therein, because workpiece 24 sits in and is held in position by the bottom 112 of receptacle 70, with surface 39 of workpiece 24 abutting bottom 112. Depending upon how receptacle 70 is rotatably adjusted about axis 94, plane 110 forms an orientation angle with the substantially horizontal plane of conveyor 18, with respect to which workstations 12, 14, and 16 are oriented. The angle A is adjustable under the influence of the repositioning and activating means as described more fully in detail below. Receptacle 70 is preferably formed of a plastic such as polyurethane, but can be any suitable material such as for example acetal.

Receptacle 70 is mounted between a pair of uprights 114 and 116 on opposing sides 118 and 120 of base 68. Uprights 114 and 116 are substantially perpendicular to planar member 72 comprising base 68. Journal means such as pins 122 and 124 mount receptacle 70 therebetween on corresponding bearing surfaces 126 and 128. Post 102 provides means for restricting the rotation of receptacle 70 in clockwise direction 130 about axis 94 past preselected clockwise angular displacement angle A, while post 100 provides means for restricting the rotation of receptacle 70 in a counterclockwise direction 132 about axis 94 past a preselected counterclockwise angular displacement, here the horizontal, or where A=0°.

Camming surfaces 134 and 136 formed in tabs 138 and 140 downwardly depending from receptacle 70 (see FIGS. 5A, 5B, and 5C) provide means for repositioning the angular orientation of receptacle 70 in response to the thrusting force of plungers 142, 144, and 146 (see FIG. 1), which are extendable from orientation stations 28, 30, and 32 respectively to exert a repositioning force F generally in directing transverse to path 26 and parallel to axis 94. If the orientation station is on the other side of the conveyor, the force is F' in an opposite direction. Such plungers provide means for activating the cam, or the repositioning means. Camming surfaces 134 and 136 cause receptacle 70 to rotate through an arc in response to forces F and F' applied thereto.

Camming surfaces 134 and 136 have curved contours, which contours are preferably the compliments of each other. That is, a plunger applied to camming surface 134 causes receptacle 70 to rotate about axis 94 in a first direction, while a plunger applied to camming surface 136 will cause receptacle 70 to rotate in the opposite direction. The exact shape of the camming surface contours are routinely determinable for relatively smooth motion.

Figure 3:
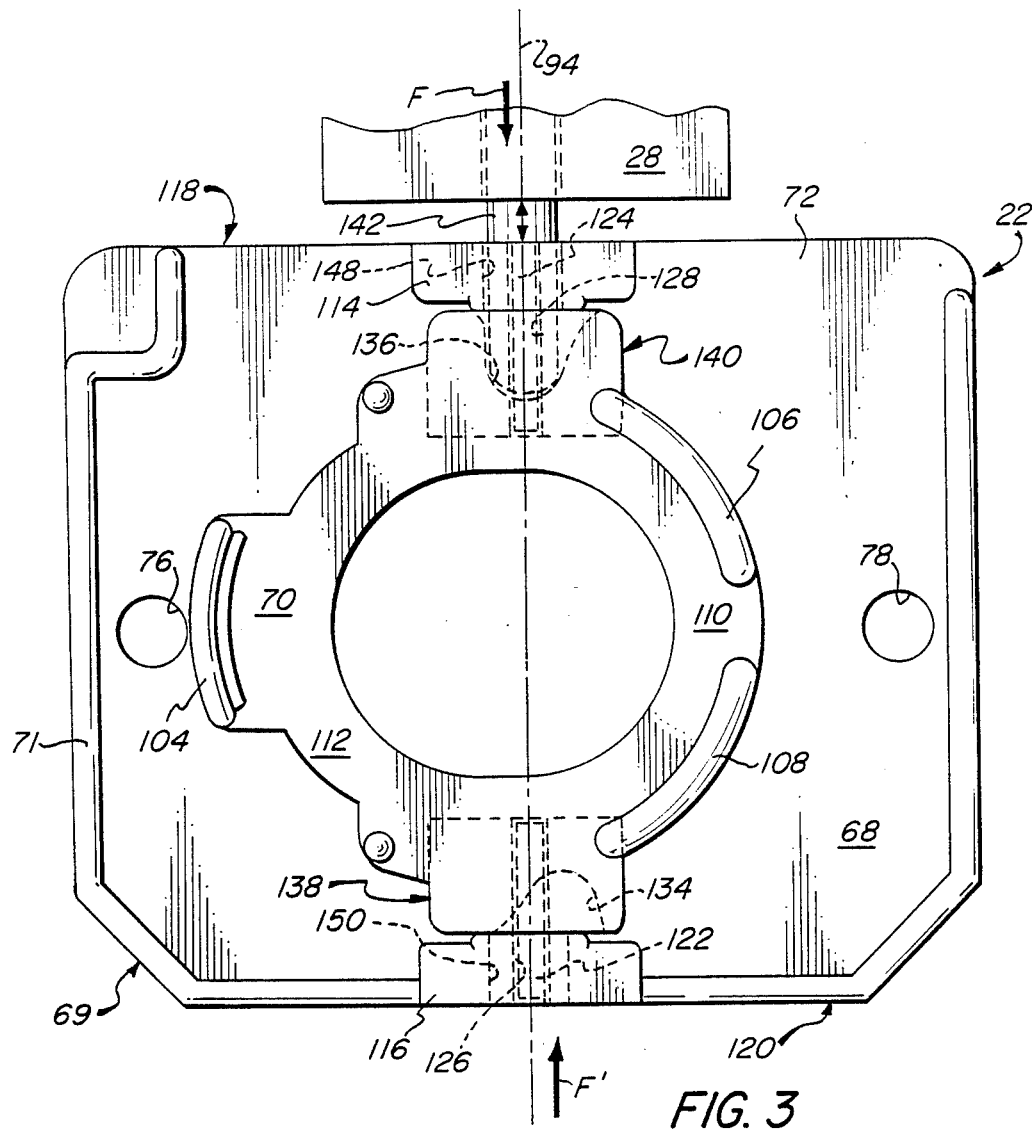
FIG. 3 is a top view of the embodiment of FIG. 2 without the workpiece.

The plungers such as 142 associated with station 28 as shown in FIG. 3 have a substantially spherically shaped end, such as a bullet nose, for pushing against the camming surfaces. Plungers 142, 144, and 146 can be operated by appropriate routine activators, such as solenoids, which can be suitably linked to a control system as desired. These plungers located in orientation stations bear a suitably spaced relationship to their associated workstations.

Uprights 114 and 116 have substantially cylindrical bores 148 and 150 for guiding the plungers into proper engagement with camming surfaces 134 and 136. The plungers are likewise substantially cylindrical along their operative lengths, the diameter of the bores and plungers being selected for slidable mating of the plungers 142, 144, and 146 with bores 148 and 150.

Tip 151 of screw 152 mounted in threaded bore 154 rides against the curved underside 156 of tab 138 and provides brake means for impeding the rotation of receptacle 70. Suitably shaped depressions 158 and 160 in curved underside 156 provide means for urging the retention of receptacle 70 at the two endpoints of its angular travel to provide stability for the workpiece during machining.

The device of the present invention can be used in a method of conveying a workpiece 24 along a series of workstations 12, 14, and 16 as shown in FIG. 1 under direction of controller 11, although it is understood that any series of workstations a, ..., n, ..., b can be used. The workpiece 24 is nested in receptacle 70, which is capable of assuming two angular orientations, one where A=0° and the other where A=K°, angle A being in this case an acute angle. It is understood, however, that receptacle 70 could also be made to assume not just two, but a variety of angular orientations by simply designing different camming surfaces and suitably controlling the action of plungers 142, 144, and 146, such that receptacle 70 might assume a plurality of positional orientations X, ..., y.

While nested in receptacle 70, workpiece 24 is conveyed to a first orientation station 28 on conveyor 18 as operated by motor 35, which is temporarily halted with receptacle 70 aligned alongside orientation station 28 such that plunger 142 can be extended through bore 148 under direction of controller 11 to engage camming surface 136 and tilt receptacle 70 to the proper angular orientation. After this operation, conveyor 18 is indexed forward by motor 35 to an aligned position under grinding wheel 46 of workstation 12, where receptacle 70 is again temporarily halted for the first machining operation. It is understood that workstation 12 could also be designed to have the capacity to completely remove workpiece 24 from receptacle 70 for the necessary operation and then return workpiece 24 thereto.

After the machining operation at workstation 12, motor 35 indexes receptacle 70 forward and aligns the bore 150 on base 68 with plunger 144 of orientation station 30. Under controller 11's direction, plunger 144 is extended to engage camming surface 134 and reposition receptacle 70 by rotation about axis 94. The plunger 144 is then withdrawn, and receptacle 70 is conveyed to workstation 14. These steps are repeated for orientation station 32 and workstation 16, as well as for any other stations that may be positioned along path 26.

Although the invention herein has been described with respect to particular features and embodiments, and illustrated with reference to particular drawings, materials of construction and the like, it is to be understood that these are not considered to be limitations of the invention except as otherwise recited in the appended claims.

I claim:

1. A device for conveying a workpiece along a conveyor path having spaced therealong at least two workstations to present said workpiece in seriatim to said workstations in at least two positional orientations as required for each particular workstation, said device comprising:

(a) a base for being transported along said path from a first workstation to a next successive workstation along said path;

(b) means mounted on said base for nesting said workpiece in a positional orientation with respect to said base to present said workpiece to each of said workstations, said nesting means being repositionable relative to said base for changing said positional orientation; and ·

(c) at least one means for repositioning said nesting means from one position to at least a second position;

(d) means for at least one of said workstations for activating said repositioning means being disposed along said path in spaced relationship to said selected ones of said workstations;

(e) means for conveying said device along at least a portion of said path, said conveying means for carrying said device along said path past said activating means for repositioning of said nesting means, said conveying means having a conveying surface for supporting objects placed thereon, said base including a body having a bottom face for resting on said surface, said body further forming a plurality of apertures therein, said apertures for mating with corresponding protuberances on said surface to releasably lockingly engage said device on said conveying means, said base comprising means for guiding said activating means into engagement with said repositioning means when said base is transported by said conveying means into position adjacent said activating means, whereby said workpiece can be successively presented to each of said workstations in plurality of positional orientations as required by each of said workstations.

2. The device of claim 1, wherein said activating means includes means for applying a force thereto, and wherein said nesting means is rotatably mounted on said base about a substantially horizontal axis, said nesting means having at least a first position characterized by a first angular displacement about said axis and a second position characterized by a second angular displacement about said axis, and said repositioning means includes at least one camming surface associated with said nesting means for receiving said force and causing said nesting means to rotate through an arc between said first and second positions in response to said force applied to said camming surface.

3. The device of claim 2, wherein said nesting means comprises means for removably holding said workpiece, said holding means being characterized by a nesting plane defining the angular orientation of said workpiece nested therein, said nesting plane forming an orientation angle with a substantially horizontal plane with respect to which said workstations are oriented, said orientation angle being adjustable between said first and second positions under the influence of said force.

4. A device for conveying a workpiece along a conveyor path having spaced therealong at least two workstations to present said workpiece in seriatim to said workstations in at least two positional orientations as required for each particular workstation, said device comprising:

(a) base for being transported along said path from a first workstation to a next successive workstation along said path;

(b) means mounted on said base for removably holding said workpiece, said holding means being characterized by a nesting plane defining the angular orientation of said workpiece nested therein, said nesting plane forming an orientation angle with a substantially horizontal plane with respect to which said workstations are oriented to each of said workstations, said holding means being repositionable relative to said base for changing said positionable relative to said base for changing said positional orientation, said holding means being rotatably mounted on said base about a substantially horizontal axis, said holding means having at least a first position characterized by a first angular displacement about said axis and a second position characterized by a second angular displacement about said axis; and (c) at least one means for repositioning said holding means from one position to at least a second position, said repositioning means includes at least one camming surface associated with said holding means for causing said holding means to rotate through an arc between said first and second positions in response to a force applied to said camming surface, means for each said workstation for activating said repositioning means by applying said force to said camming surface, said orientation angle being adjustable between said first and second positions under the influence of said force, said camming surface being shaped to be engaged by plunger means, and said activating means includes said plunger means, said plunger means being extendable for applying said force in a direction substantially parallel to said axis for pushing against said camming surface to rotate said holding means from one position to the other, whereby said workpiece can be successively presented to each of said workstations in a plurality of positional orientations as required by each of said workstations.

5. The device of claim 4, wherein said camming surface has a curved contour and said plunger means comprises a plunger having a substantially spherically shaped end for pushing against said contour, said contour being shaped for moving said holding means between said first and second positions in a relatively smooth manner.

6. The device of claim 5, wherein said base comprises a substantially planar member having two uprights on opposing sides thereof substantially perpendicular to said member, said holding means being mounted between said uprights on journal means supported by bearing means in said uprights, and said base further includes first means for restricting the rotation of said holding means in a clockwise direction about said axis past a preselected clockwise angular displacement and second means for restricting the rotation of said holding means in a counterclockwise direction about said axis past a preselected counterclockwise angular displacement.

7. The device of claim 6, wherein said first and second restricting means comprise posts extending from said member in a generally upright direction and said clockwise and counterclockwise angular displacements are defined by the respective lengths of said posts.

8. The device of claim 7, wherein at least one of said uprights forms an aperture extending therethrough, and said camming surface is aligned for receiving said plunger and guiding said plunger against said camming surface.

9. The device of claim 8, wherein said aperture is a substantially cylindrical bore and said plunger is substantially cylindrical along its operative length, the diameter of said bore and said plunger being selected for slidable mating of said plunger in said bore.

10. The device of claim 9, wherein said holding means further includes at least one tab means extending generally perpendicularly from said holding means in a direction generally toward said base, said tab means having said camming surface formed therein in substantial alignment with said bore.

11. The device of claim 10, wherein said camming surface is shaped to translate the thrusting force of said plunger into a torque about said axis for changing the angular orientation of said holding means.

12. The device of claim 11, wherein said base and said holding means comprise a moldable plastic material.

13. The device of claim 10, wherein said holding means further includes second tab means having a second camming surface formed therein, said second tab means being substantially diametrically opposed from said first tab means.

14. The device of claim 13, wherein said first and second camming surfaces are substantially congruent.

15. The device of claim 8 further comprising adjustable means for restricting the rotation of said holding means and urging the retention of said holding means at the endpoints of its rotation.

16. The device of claim 15, wherein said base further forms a threaded bore means extending through said member and said holding means further forms a braking surface adjacent and aligned with said threaded bore, and said adjustable restricting means includes a threaded member mounted in said bore means for brakingly engaging said braking surface, whereby said threaded member can be adjustably threaded inwardly or outwardly to adjustably restrict the rotation of said holding means.

17. A part carrier for transporting a part to be machined on first and second surfaces thereof, each of said surfaces lying in first and second surfaces thereof, each of said surfaces lying in first and second planes respectively, said planes lying at an angle with respect to each other, said carrier for transporting said part along a conveyor path to at least two machining workstations aligned with said path, one such workstation for machining each of said surfaces, said part carrier comprising:

(a) a base for mounting onto said conveyor;

(b) means for nesting said part, said nesting means being rotatably mounted on said base about an axis substantially parallel to said base, said nesting means forming at least one camming surface for rotating said nesting means about said axis from a first position to a second position, said nesting means for holding said part in a fixed orientation with respect to said nesting means, said part for being presented to said workstations in at least two angular orientations corresponding to said two surfaces; and (c) plunger means for acting upon said camming surface, one said plunger means associated with each said workstation for rotating said part to the proper position for machining.

* * * * *